(12) United States Patent
Qin (10) Patent No.: US 9,279,460 B2
(45) Date of Patent: Mar. 8, 2016

(54) ACCESSORY DRIVE WITH FRICTION CLUTCH AND ELECTRIC MOTOR (71) Applicant: BorgWarner Inc., Auburn Hills, MI (US)

(72) Inventor: Shiwei Qin, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 102 days.

(21) Appl. No.: 14/149,683

(22) Filed: Jan. 7, 2014

(65) Prior Publication Data
US 2014/0174874 A1  Jun. 26, 2014

Related U.S. Application Data (63) Continuation-in-part of application No. 14/135,280, filed on Dec. 19, 2013.

(60) Provisional application No. 61/745,647, filed on Dec. 24, 2012.

(51) Int. Cl.
F16D 13/76 (2006.01)
F01P 5/12 (2006.01)
F16D 27/112 (2006.01)

(52) U.S. Cl.
CPC ............. *F16D 27/112* (2013.01); *F16D 13/76* (2013.01)

(58) Field of Classification Search
CPC . F16D 27/112; F16D 13/76; F16D 2500/504; F16D 2500/5041
USPC ................................................ 192/90; 417/16
See application file for complete search history.

(56) References Cited

U.S. PATENT DOCUMENTS

| 5,551,546 | A  | * | 9/1996  | Tabayama et al. | ......... 192/84.96 |
| 8,978,600 | B2 | * | 3/2015  | Shutty          | ..... F01P 7/164   |
|           |    |   |         |                 | 123/41.47          |
| 2010/0126822 | A1 | * | 5/2010  | Winkler et al. | ................. 192/90 |
| 2013/0306005 | A1 | * | 11/2013 | Shutty et al.  | ............... 123/41.47 |
| 2014/0023526 | A1 | * | 1/2014  | Roby           | ............. 417/223 |
| 2015/0184575 | A1 | * | 7/2015  | Shutty et al.  | .................... 192/90 |

* cited by examiner

Primary Examiner — Robert Hodge
Assistant Examiner — Tinh Dang (57) ABSTRACT A friction clutch assembly for a vehicle accessory, particularly to drive a vehicle cooling pump, and more particularly as part of a dual mode drive for a cooling pump, together with an electric motor. The friction clutch assembly includes a friction plate member connected to a central rotatable shaft member used for operating the vehicle accessory. A biased armature member is adapted to force a friction plate member with friction linings thereon against a housing or cover which is rotating at input speed. A solenoid assembly is used to overcome the spring bias and pull the armature and friction plate member away from the housing.

34 Claims, 6 Drawing Sheets

FIG. 6

ACCESSORY DRIVE WITH FRICTION CLUTCH AND ELECTRIC MOTOR

CROSS-REFERENCE TO RELATED APPLICATIONS

This application is a continuation-in-part of U.S. patent application Ser. No. 14/135,280 (DKT12180A (BWA 0427 PUS) filed on Dec. 19, 2013, which is a non-provisional of U.S. Patent Application No. 61/745,647, filed on Dec. 24, 2012. This application is also related to U.S. Patent Application Ser. No. 61/474,862 and U.S. Patent Application Ser. No. 61/474,928, both filed on Apr. 13, 2011.

TECHNICAL FIELD

Improved friction clutch assemblies, particularly for hybrid accessory drives for coolant pumps and the like.

BACKGROUND

Vehicle engine accessories, such as water pumps and cooling fans, are in common use in automobiles and other vehicles. These accessories are typically driven by a belt attached to the crankshaft of the engine and thus operate at some percentage of engine speed. The water pumps have an impeller that is used to circulate the engine coolant from the engine to the radiator and back in order to keep the coolant within acceptable temperature limits. Cooling fans have a fan with blades that supplies atmosphere air to, for example, a radiator to cool the engine coolant.

Efforts are being made today to reduce the power consumption of engine accessories, such as water pumps and fan drives, in order to improve fuel economy and reduce emissions. It would thus be preferable if such accessories could be made to operate at variable speeds or with less power in order to reduce the load on the engine and, in turn, improve fuel economy and reduce undesirable emissions from the engine.

SUMMARY OF THE INVENTION

A vehicle accessory drive assembly, such as a cooling pump or fan drive, having an improved dry friction clutch mechanism is disclosed. The accessory drive preferably has two modes of operation, a first mode mechanically driven by an engine belt, and a second mode operated by an electric motor, such as a brushless DC (BLDC) motor. The components for the two modes of operation are included as part of a multi-component assembly that includes a pulley member. The pulley is turned at input speed by an engine belt positioned on the pulley member. A shaft connected to the impeller of a water pump, or the blades of a fan, is positioned in the assembly and is controlled by either the mechanical or electrical operation, or both, depending on certain factors.

The friction clutch assembly is positioned inside a housing and selectively allows operation of the accessory mechanically by the pulley member. The dry friction clutch assembly is activated by turning on/off a solenoid. In one embodiment, when the solenoid is off for any reason, the clutch will be engaged, and thus the clutch is fail-safe. When the solenoid is off, one or more spring or biasing members activate a plate which clamps a friction member against the cover. Torque is transferred through the friction plate. The clutch is disengaged by activating the solenoid.

When the solenoid is on, the solenoid force overcomes the force of the biasing members and causes the plate to contact the pulley, and another spring or biasing member spaces the plate away from the cover and holds it against a stop, creating air gaps on both sides of the plate. When the clutch is disengaged, the input (pulley) and output (shaft) are disconnected, eliminating interaction (and bearing drag) between the input and output.

The accessory is normally driven by the electric motor throughout most of its range of operation. When peak usage requirements are needed, the mechanical mode of operation takes over and the accessory can be driven directly by the pulley member.

Further objects, features and benefits of the invention are set forth below in the following description of the invention when viewed in combination with the drawings and claims.

DESCRIPTION OF THE PREFERRED EMBODIMENTS

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons or ordinary skill in the art to which the invention relates.

The present inventions described herein relate to dual mode friction clutch assemblies particularly used for accessories, such as coolant pumps and fans which circulate coolant or air into or through an engine, such as an automobile internal combustion engine. (The terms "water pump" and "coolant pump" are used interchangeably herein.) The present invention, however, can also be used for other engine accessory devices.

The preferred coolant pump embodiment of the present invention as described herein is particularly adapted for use with trucks, passenger cars and off-highway vehicles, and will be described with respect to its use in a dual mode coolant pump. It is to be understood that the patent invention is not to be limited or restricted to use as a coolant pump, or limited to the precise structure and operation as described herein.

In accordance with this preferred embodiment, the electric motor is a brushless DC (BLDC) motor. For the mechanical mode of operation, the accessory is driven by an engine belt, such as a serpentine accessory belt, attached to the crankshaft of the engine. As a dual mode accessory operating mechanism, it is electrically driven under most conditions. However, it also can be mechanically engaged where more power or speed is required. Thus, when the vehicle is being driven under most normal conditions, the accessory is being driven and operated by the electric motor.

During "worst ease" conditions, such as when the vehicle is heavily loaded, when it is pulling a trailer, or when it is going up hill in the summertime, etc., the accessory is adapted to be mechanically driven by the belt directly from the engine. This provides the necessary power or activation performance under such circumstances.

A hybrid (dual mode) water pump embodiment with a friction clutch assembly in accordance with the present invention is shown in FIGS. 1-5 and referred to generally by the reference numeral 20. The hybrid water pump includes a motor housing 22, a solenoid housing 24, a pulley member 26 and a cover member 28. A central shaft member 30 is rotated by the pump 20 which operates the water pump impeller 32. As shown, the pulley member has a smooth outer surface 27 on which an engine belt (not shown) is positioned. The outer surface of the pulley member could also comprise circumferential grooves or any other conventional structure for mating with an engine belt with corresponding grooves or mating structure.

Figure 1:
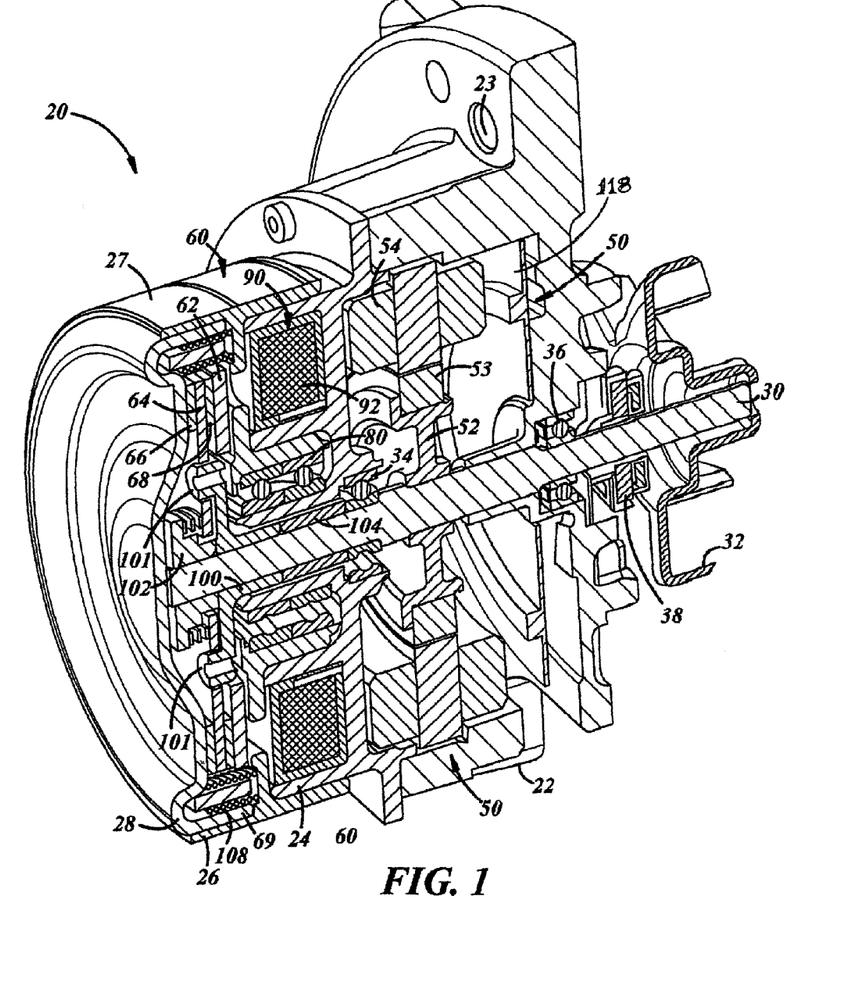
FIG. 1 is a cross-sectional view of a vehicle accessory which incorporates an embodiment of the present invention.
Figure 2A:
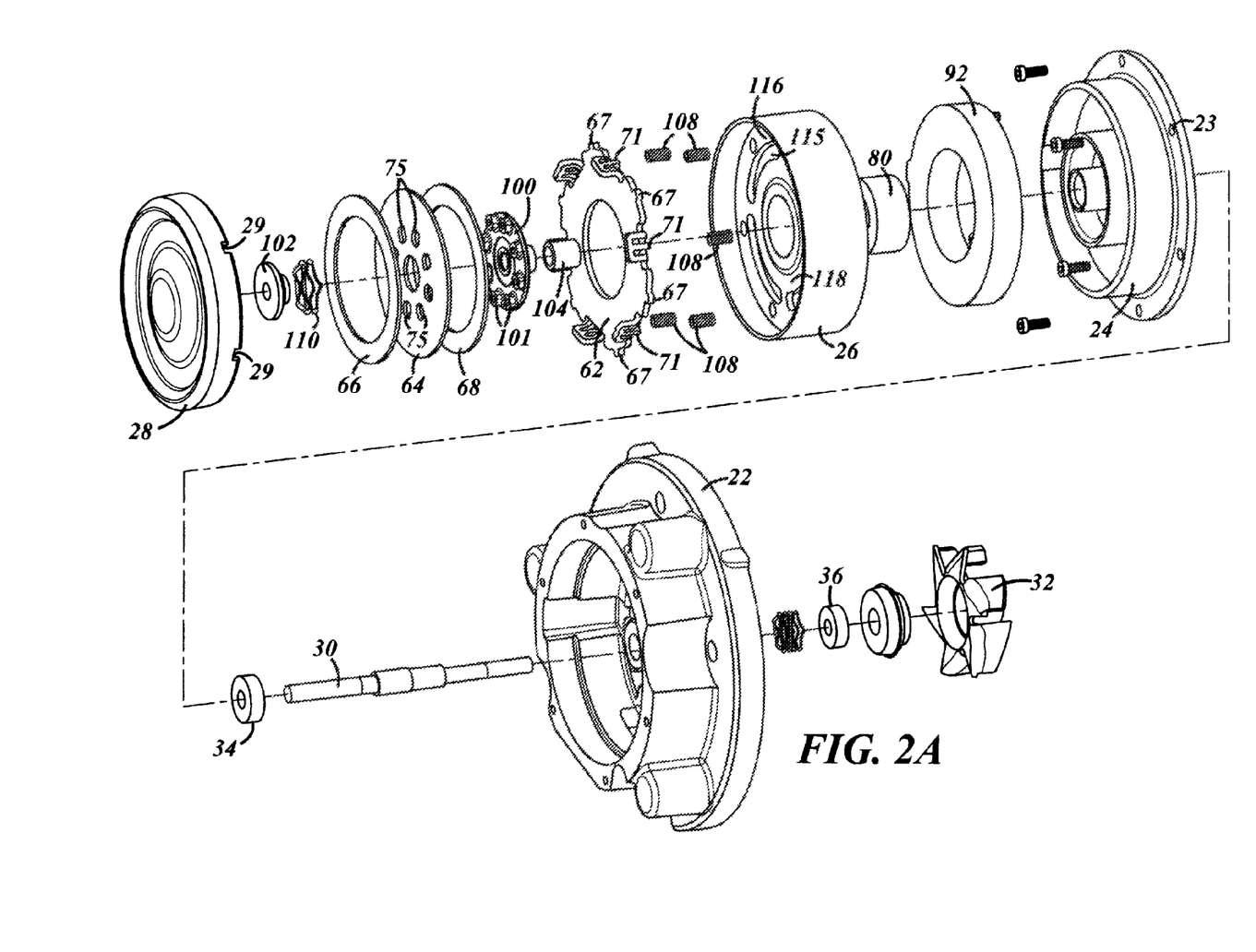
FIGS. 2A and 2B are exploded views of the components of the assembly as shown in FIG. 1.
Figure 2B:
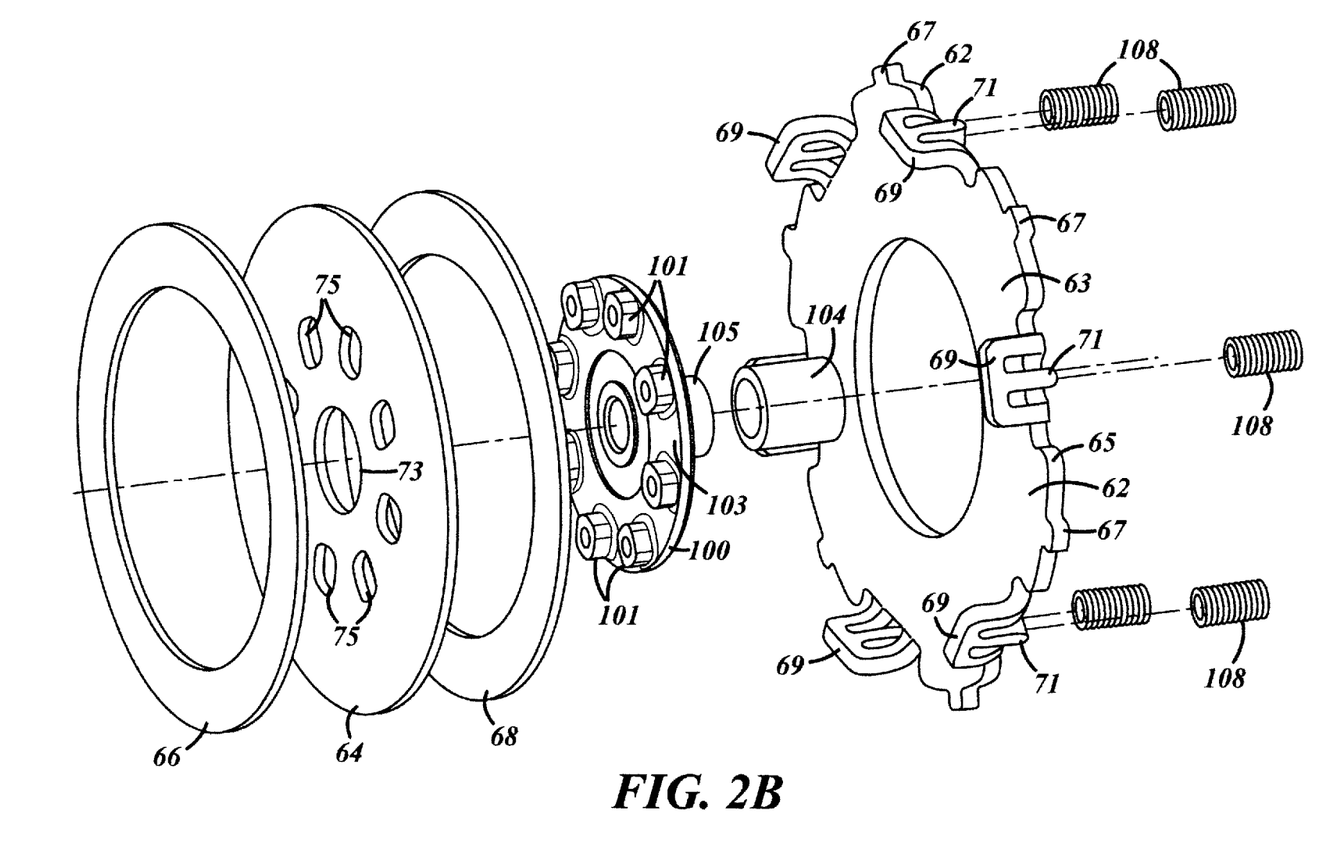
Figure 3:
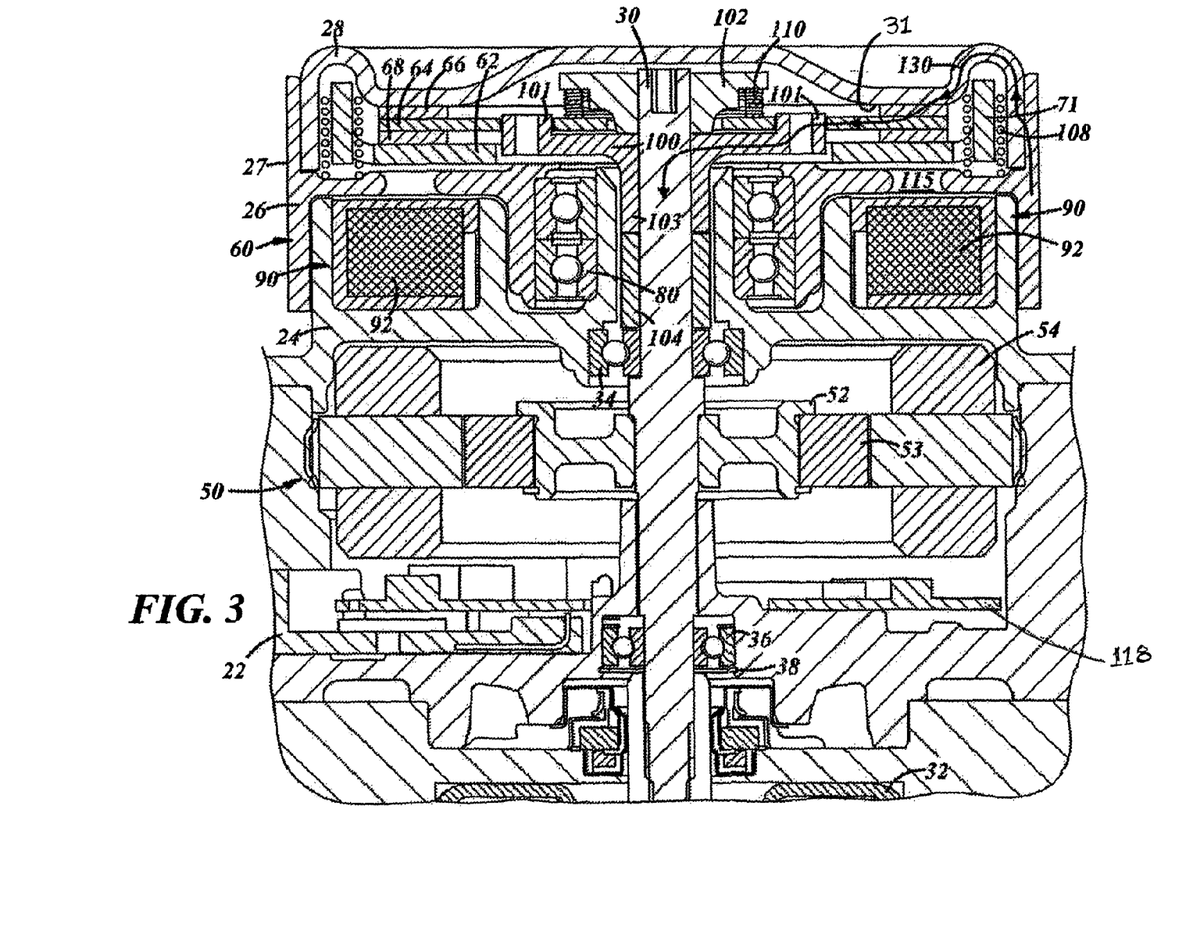
FIG. 3 is an enlarged cross-sectional view of the assembly shown in FIG. 1 with the components shown in the engaged position.
Figure 4:
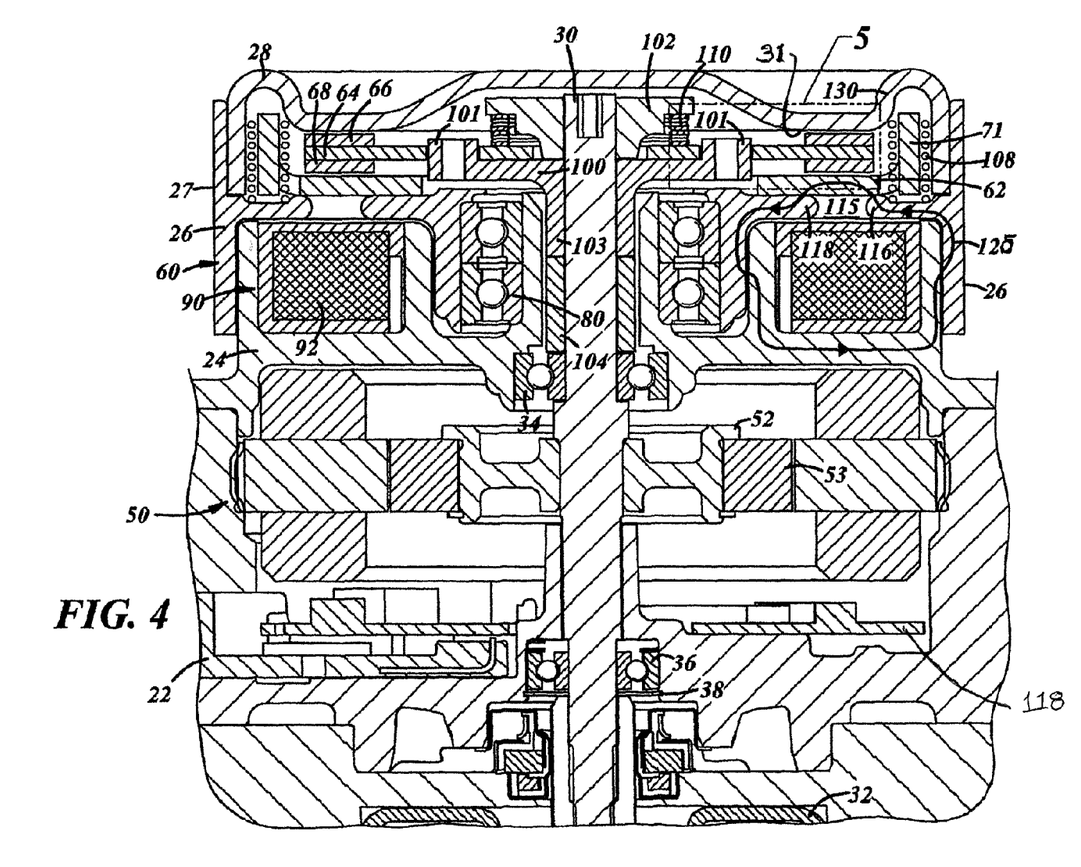
FIG. 4 is an enlarged cross-sectional view of the assembly shown in FIG. 1 with the components shown in the disengaged position.
Figure 5:
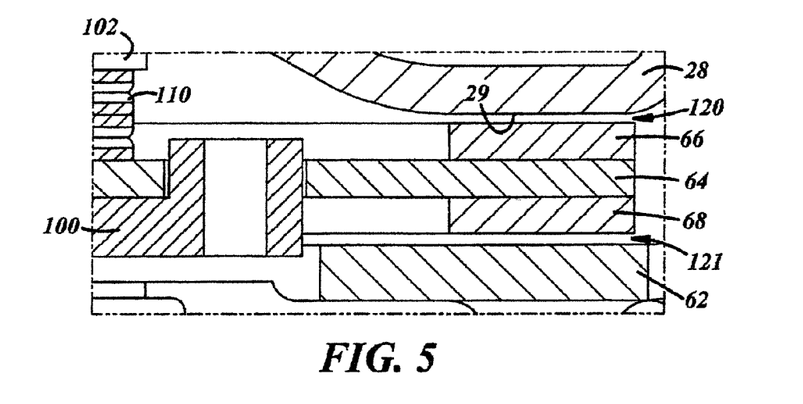
FIG. 5 is an enlarged view of a portion of the cross-section shown in FIG. 4.

Exploded views of the components of the water pump assembly 20 are shown in FIGS. 2A and 2B. Enlarged views showing the friction clutch mechanism in the solenoid deactivated and activated modes of operation are shown in FIGS. 3-5.

The impeller shaft 30 is held in place in the multi-component assembly by bearings 34 and 36. A coolant seal 38 is used to prevent coolant in the pump from leaking into the motor housing.

A motor 50 is positioned inside the motor housing 22. The motor 50 includes a rotor carrier 52, magnets 53, and a stator 54. Magnets 53 are bonded to the rotor carrier 52 and together form the rotor of the motor. The motor 50 is preferably a brushless DC (BLDC) electric motor. The rotor 52 is securely attached, e. g. press fitted, to the shaft 30, which causes the shaft, and thus the impeller 32, to rotate when the motor 50 is operated. Electricity to the motor 50 is supplied by an electrical source (not shown).

The motor housing 22 has a plurality of mounting members, such as fastener opening 23, as shown in the drawings. Other openings are also provided for attachment of the water pump assembly 20 inside the engine compartment of a vehicle. The size, positioning and number of mounting members will depend on the type of accessory and the location in the vehicle and/or on the engine where the accessory is to be mounted.

The friction clutch assembly is designated generally by the reference numeral 60. The friction clutch assembly generally comprises an armature plate 62, a friction plate 64, and two annular rings of friction material 66 and 68. The armature plate 62 is preferably made of a magnetic metal material, such as low carbon steel. The friction plate 64, also called a "clutch plate", is preferably made of a non-magnetic material, such as stainless steel.

The friction materials 66 and 68 can be any conventional friction materials used in friction clutches today, and can be complete rings, segments of rings, or simply pieces of friction material positioned generally where rings 66 and 68 are positioned in the drawings. Preferably, the friction materials 66, 68 are permanently attached to the friction plate 64, such as by a bonding agent.

The cover member 28, which preferably is made of a non-magnetic material such as stainless steel, is preferably press-fit directly to the pulley member 26. The cover member could also be fixedly attached to the pulley member by other conventional means, such as by welding or a roll-over assembly. Thus, when the pulley is rotated by an engine belt; the cover member 28 rotates with it at the same input speed.

The pulley member 26 is preferably made of a magnetic metal material, such as low carbon steel. The pulley member rotates freely around bearings 80. Although the bearings can be of any type that will have sufficient durability and performance, a pair of stacked bearings can be utilized, as shown in the drawings.

The operation of the friction clutch assembly is performed by a solenoid assembly 90. The solenoid assembly includes a solenoid coil 92 which is positioned in the solenoid housing 24. The solenoid coil member comprises a donut-shaped coil of copper wires, while the solenoid housing is preferably made of a magnetic material, such as low carbon steel. The solenoid coil member 92 can be potted in the solenoid housing 24.

The bearing 34 allows the shaft member 30 to rotate freely relative to the solenoid housing 24.

The solenoid housing 24 is connected directly to the motor housing 22 by, for example, a press fit and/or fastener members (not shown). In production, several different ways can be used within the skill of the art in order to anchor or permanently attach the solenoid housing 24 to the motor housing 22.

The armature plate member 62 is shown in more detail in FIGS. 2A and 2B. The armature plate member has an annular base member 63, with a plurality of radially extending flange members 65, each having a tab member 67. A plurality of upturned spring retainer member 69 are also included on the armature plate member.

The tab members 67 are positioned to mate with corresponding notches 29 in the cover member 28. When the accessory member 20 is assembled, the tab members 67 are positioned in the notches 29. The notches have a size to allow the tab members to move axially in them (as the armature plate is moved axially in operation of the accessory). At all times, however, the tab members remain in the notches so that torque can be transferred between the cover member and the armature plate. In this manner, the armature plate and the cover member rotate at input speed with the pulley member 26.

Although six tab members 67 and six mating notches 29 are provided in the preferred embodiment, more or less tabs and notches could be provided, so long as the performances and operation are the same or equivalent.

The spring retainer members 69 have a general "M" shape with an outer U-shaped ring and a middle finger member 71 unconnected at one end. Coil spring members 108 are provided, one of each which is positioned on each of the finger members 71. When the accessory member 20 is assembled, the coil spring members 108 are positioned between the armature plate member 62 and the pulley member 26 and bias the armature plate member in an axial direction away from the pulley member.

Although six coil spring members 108 and six spring retainer members 69 are shown and described herein, there can be more or less of both members, so long as the operation of the accessory member 20 is the same or equivalent. Also, the size and type of spring members that can be utilized in the invention is dependent on many factors, such as the weight of the components needed to be biased, the amount of force necessary to compress them, and the physical limitations of the location at which they are positioned. In addition, even though the biasing members are shown and described to be coil springs, any other comparable biasing members could be utilized so long as the performance and operation of the accessory remain the same or equivalent.

The friction plate 64 has a circular shape with a central opening 73 for the shaft member 30 and a plurality of smaller openings 75. Also, as indicated above, friction members 66, 68 are positioned on the two sides of the friction plate.

The openings 75 in the friction plate are provided to mate with lug members 101 on stop member 100. The stop member 100 is press fit on the shaft member 30. It has a circulate plate member 103 and a collar member 105 which fits around the shaft member 30. The stop member 100 is preferably made of a non-magnetic material, such as stainless steel. The lug members 101 are positioned on the plate member 103 in location to fit easily with the openings 75 in the friction member. The precise number of mating lug members 101 and openings 75 is not critical. More or less mating features could be provided.

The loose fitting of the lugs 101 in the opening 75 allow the friction plate member 64 to move axially relative to the plate member 100. The lug members also cause the friction plate member 64 to rotate with the shaft member 30.

A nut member 102 is threaded, or otherwise firmly fixed, on the end of the shaft member 20. Positioned on the shaft member 30 between the nut member 102 and the friction plate member 64 is a spring member 110. The spring member 110 provides a biasing force against the friction plate member 64 in an axial direction to prevent the friction member 66 on the plate member 64 from contacting the inner surface 31 of the cover member 28. As explained below, the spring member 110 acts to return the friction plate member 64 to its mechanically disengaged position when the solenoid assembly 90 is activated.

Bearing member 34 in an axial position inside the solenoid housing 24, and determines the axial position of shaft 30. Cylindrical member 104 is provided. Cylindrical member 104 is positioned between the stop member 100 and the bearing member 34.

As indicated, the water pump impeller 32 is normally driven by the electric motor 50. The electric motor and the solenoid coil are electrically powered through a circuit board 118. Electrical leads and wires can be insert molded in the motor housing 22 in order to carry the electrical signals to the electric motor 50 and solenoid coil member 92. The circuit board further communicates with the engine control unit (ECU) of the vehicle through the vehicle communication network such as a CAN network. In this embodiment, the water pump assembly controller circuit board is positioned inside the motor housing 22 having a donut shape.

The speed of the motor and thus the water pump is selected according to the cooling required for the engine. Sensors feed relevant data to the ECU which then sends a signal to the pump controller requesting the desired speed. The pump controller then determines whether the desired speed is best achieved using the electric motor or by engaging the friction clutch and driving the impeller directly from the pulley.

When the water pump is being driven solely by the electric motor 50, the friction clutch assembly 60 is held in a disengaged position by the solenoid assembly 90. This is shown in FIGS. 4 and 5. When the solenoid coil member 92 is electrically activated, a flux circuit 125 is created which acts to pull the armature plate 62 toward the solenoid coil member overcoming the force of the coil spring members 108. With the armature plate 62 pulled toward the solenoid, the return spring 110 holds the friction plate 64 against the stop member 100. In this condition, as more particularly shown in enlarged form in FIG. 5, the friction materials 66, 68 on the friction plate 64 are not in contact with either the cover member 28 or the armature plate 62.

In this electrical mode of operation, there are air gaps 120, 121 on the sides of the friction materials on the friction plate. The input (pulley member) and output (shaft member) are completely disconnected. This eliminates any interaction, such as bearing drag between the input and output.

In order to create an appropriate flux circuit 125, the pulley member 26 has a plurality of openings 115 which create air gaps. The openings 115 essentially form an annular open ring. With the air gaps, the pulley member, is for electromagnetic purposes, essentially an outer annular ring 116 and a separated annular inner ring 118. (This is best shown in FIGS. 2A and 4.)

The flux circuit 125 is shown in FIG. 4. It runs through the solenoid housing 24, the belt engaging portion of the pulley member 26, outer annular ring portion 116 of the pulley member 26, and then jumps to the armature plate member 62 and then back to the inner annular ring 118 portion of the pulley member 26 where it returns to the solenoid housing 24. This circuit pulls the armature member 62 tightly to the pulley member 26 when the solenoid assembly is activated.

FIG. 3 depicts the situation where the solenoid assembly 90 is not activated. This causes the water pump to be driven mechanically by an engine belt. The electric motor 50 is turned off. In this situation, the coil spring members 108 force the armature member 62 in an axial direction away from the pulley member 26 and away from the solenoid assembly 90. This causes the armature member 62 to contact the friction member 68 which in turn forces the friction member 66 to contact the inner surface 31 of the cover member 28. Since the armature member, pulley member and cover member are all fixed together, this causes the shaft member 30 to rotate at the same speed.

A path of torque transfer which mechanically rotates the shaft member is shown by arrows 130 in FIG. 3. In the engaged clutch, the friction plate member is clamped between the cover member and armature member and torque is transferred through both sides of the friction plate.

In one preferred embodiment as shown in the drawings, the present invention provides a "fail-safe" friction clutch design. If the electrical system of the coolant pump were to fail, the solenoid would be de-energized allowing the coil springs to force the friction clutch assembly to become engaged. Therefore the pump would operate in mechanical mode with the impeller driven by the pulley member through the clutch assembly, thus preventing overheating.

Figure 6:
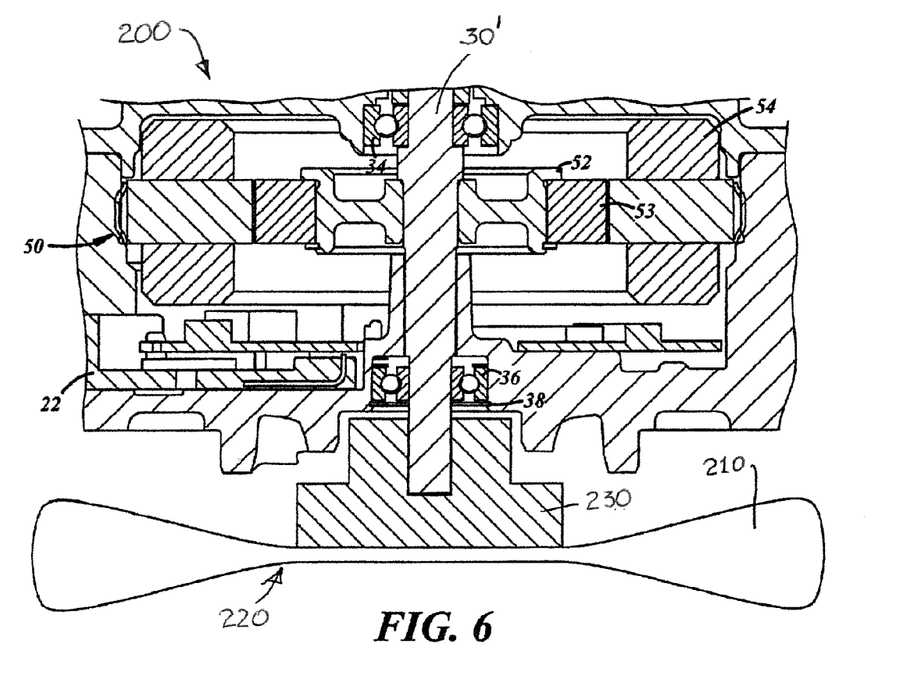
FIG. 6 depicts an alternate embodiment of the invention.

FIG. 6 schematically depicts the use of the inventive friction clutch for operating a cooling fan. The cooling fan accessory mechanism is referred to generally by the reference numeral 200.

The friction clutch mechanism is substantially the same as the friction clutch mechanism described above which is utilized to selectively rotate a water pump impeller. In this embodiment, the friction clutch mechanism is utilized to rotate a cooling fan 210. The components which are the same are referred to by the same reference numerals as set forth above in the other Figures. The main differences are that the shaft member 30', when activated, rotates a cooling fan assembly 220. The fan assembly includes a cooling fan 210 which has a number of blade members and central hub member 230. The hub member is securely attached to the shaft member 30', and the fan 210 is securely attached to the hub member 230 in a conventional manner, such that the housing, fan and blades will rotate when the shaft member rotates and at the same speed. Any conventional means or mechanisms can be utilized to attach the components together so they all rotate together.

Although the invention has been described with respect to preferred embodiments, it is to be also understood that it is not to be so limited since changes and modifications can be made therein which are within the full scope of this invention as detailed by the following claims.

What is claimed is:

1. A friction clutch assembly for a vehicle engine accessory, the accessory having a housing member with a cover member and a solenoid portion, a pulley member attached to the cover member, an internal shaft member which is selectively rotatable for operating the accessory, and a solenoid assembly positioned in the solenoid portion of the housing, said friction clutch assembly comprising:
an armature member, said armature member made of a magnetic material and capable of axial movement relative to the internal shaft member when energized by the solenoid assembly;
said armature member having spring retaining members;
a friction plate member positioned axially adjacent said armature member;
friction members positioned on opposite sides of said friction plate member;
coil spring members positioned on said spring retaining members and biasing said armature member in an axial direction away from the pulley member;
wherein when said solenoid assembly is actuated, said armature member is pulled axially toward said solenoid member preventing at least one of said friction members from contacting the cover member; and
wherein when said solenoid assembly is not activated, said coil spring members bias said armature member axially against said friction plate member causing one of said friction members to contact said cover member and thereby causing rotation of said internal shaft member and operating said accessory.

2. The friction clutch assembly as set forth in claim 1 wherein each of said friction members comprise annular rings of friction lining material.

3. The friction clutch assembly as set forth in claim 1 wherein said cover member is attached to said pulley member.

4. The friction clutch assembly as set forth in claim 3 wherein said attachment is selected from the group comprising a press fit, a roll over, and welding.

5. The friction clutch assembly as set forth in claim 1 wherein a flux path is provided for axially moving said armature member when the solenoid assembly is activated, said flux path comprising a path through said solenoid assembly, said pulley member, said armature member, back to said pulley member and then back to said solenoid assembly.

6. The friction clutch assembly as set forth in claim 1 further comprising a return spring member for biasing said friction plate member axially toward said solenoid assembly.

7. The friction clutch assembly as set forth in claim 1 further comprising a stop member axially adjacent said friction plate member, wherein said stop member restricts axial movement of said friction plate member in one direction.

8. The friction clutch assembly as set forth in claim 7 wherein said stop member is press fit on said shaft member.

9. The friction clutch assembly as set forth in claim 7 further comprising a plurality of openings in said friction plate member and a corresponding plurality of lug members on said stop member, said lug members being slidingly positioned in said openings.

10. The friction clutch assembly as set forth in claim 1 further comprising a plurality of tab members on said armature member and a corresponding plurality of mating notch members in said cover member, wherein torque can be transferred from said cover member to said armature member.

11. A friction clutch assembly for a vehicle coolant pump, said coolant pump having a central shaft member for rotating an impeller, said friction clutch assembly comprising:
a solenoid assembly comprising a solenoid housing and a solenoid coil member;
a pulley member rotatable at input speed;
a housing member attached to said pulley member and rotatable therewith;
an axially moveable magnetic armature member;
at least one biasing member for biasing said armature member axially away from said solenoid assembly;
friction plate member connected to said central shaft member and rotatable therewith;
a first friction lining member positioned on a first surface of said friction plate member and adjacent said armature member;
a second friction lining member positioned on a second and opposite surface of said friction plate member and adjacent said housing member; and
a stop member positioned adjacent said friction plate member;
wherein when said solenoid assembly is not electrically actuated, said at least one biasing member force said armature member and said friction plate member axially in a direction toward said housing member wherein said second friction lining member contacts said housing member causing said friction plate member and said central shaft member to rotate at input speed;
wherein said stop member restricts axial movement of said friction plate member when said solenoid assembly is activated.

12. The friction clutch assembly as set forth in claim 11 wherein said stop member is press fit on said shaft member.

13. The friction clutch assembly as set forth in claim 11 further comprising a plurality of openings in said friction plate member and a corresponding plurality of lug members on said stop member, said lug members being slidingly positioned in said openings.

14. The friction clutch assembly as set forth in claim 11 wherein a flux path is provided for axially moving said armature member when the solenoid assembly is activated, said flux path comprising a path through said solenoid assembly, said pulley member, said armature member, back to said pulley member and then back to said solenoid assembly.

15. The friction clutch assembly as set forth in claim 11 further comprising a return spring member for biasing said friction plate member axially away from said housing member.

16. The friction clutch assembly as set forth in claim 11 wherein said pulley member comprises a plurality of openings forming an insulating air gap between an inner ring portion and an outer ring portion.

17. The friction clutch assembly as set forth in claim 11 further comprising a plurality of tab members on said armature member and a corresponding plurality of mating notch members in said housing member, wherein torque can be transferred from said housing member to said armature member.

18. The friction clutch assembly as set forth in claim 11 wherein said cover member is press fit together with said pulley member.

19. A dual mode drive device for a vehicle accessory comprising:

(a) a housing member;
(b) rotatable shaft member in said housing for selectively operating said vehicle accessory;
(c) an electric motor in said housing member for selectively rotating said shaft member and operating said vehicle accessory; and
(d) a friction clutch assembly in said housing member for assisting in selectively operating said vehicle accessory, said friction clutch assembly comprising:
a solenoid assembly with a solenoid coil member;
a pulley member rotatable at input speed;
a housing cover member attached to said pulley member and rotatable therewith;
an armature member, said armature member made of a magnetic material and capable of axial movement relative to the shaft member when energized by the solenoid assembly;
said armature member having spring retaining members;
a friction plate member positioned axially adjacent said armature member;
a first friction member positioned on a first side of said friction plate member, and a second friction member positioned on the opposite side of said friction plate member;
coil spring members positioned on said spring retaining members and biasing said armature member in an axial direction away from the pulley member;
wherein when said solenoid assembly is actuated, said armature member is pulled axially toward said solenoid member preventing at least one of said friction members from contacting the cover member; and
wherein when said solenoid assembly is not activated, said coil spring members bias said armature member axially against said friction plate member causing one of said friction members to contact said cover member and thereby causing rotation of said rotatable shaft member and operating said accessory.

20. The friction clutch assembly as set forth in claim 19 wherein said solenoid assembly is not electrically actuated, said armature member is forced against one of said first or second friction members, causing said armature member to rotate at input speed.

21. The friction clutch assembly as set forth in claim 19 wherein said housing member comprises a cover member.

22. The friction clutch assembly as set forth in claim 19 wherein said electric motor is a brushless DC motor.

23. The friction clutch assembly as set forth in claim 19 wherein said vehicle accessory is a water pump.

24. The friction clutch assembly as set forth in claim 19 wherein said rotatable shaft member is attached to a water pump impeller member and said vehicle accessory is a water pump.

25. The friction clutch assembly as set forth in claim 19 wherein six coil spring members are provided.

26. The friction clutch assembly as set forth in claim 19 wherein said first and second friction members each comprise annular rings of friction lining material.

27. The friction clutch assembly as set forth in claim 19 further comprising a return spring member for biasing said friction plate member axially away from said housing cover member.

28. The friction clutch assembly as set forth in claim 19 wherein said pulley member comprises a plurality of openings forming an insulating air gap between an inner ring portion and an outer ring portion.

29. The friction clutch assembly as set forth in claim 19 wherein a flux path is provided for axially moving said armature member when the solenoid assembly is activated, said flux path comprising a path through said solenoid assembly, said pulley member, said armature member, back to said pulley member and then back to said solenoid assembly.

30. The friction clutch assembly as set forth in claim 19 wherein said pulley member and said housing cover member are attached together by a plurality of fastener members.

31. The friction clutch assembly as set forth in claim 30 wherein said fastener members are bolts.

32. The friction clutch assembly as set forth in claim 19 wherein the connection between said friction plate member and said rotatable shaft member comprises a nut member.

33. The friction clutch assembly as set forth in claim 19 wherein said housing cover member is press fit together with said pulley member.

34. A dual mode drive device for a vehicle accessory comprising:
(a) a housing member;
(b) rotatable shaft member in said housing member for selectively operating said vehicle accessory;
(c) an electric motor in said housing member for selectively rotating said shaft member and operating said vehicle accessory; and
(d) a friction clutch assembly in said housing member for assisting in selectively operating said vehicle accessory, said friction clutch assembly comprising:
said solenoid assembly with a solenoid coil member;
a pulley member rotatable at input speed;
said housing cover member attached to said pulley member and rotatable therewith;
a solenoid assembly comprising a solenoid housing and a solenoid coil member;
a pulley member rotatable at input speed;
a housing member attached to said pulley member and rotatable therewith;
an axially moveable magnetic armature member;
biasing members for biasing said armature member axially away from said solenoid assembly;
friction plate member connected to said rotatable shaft member and rotatable therewith;
a first friction lining member positioned on a first surface of said friction plate member and adjacent said armature member;
a second friction lining member positioned on a second and opposite surface of said friction plate member and adjacent said housing member; and
a stop member positioned adjacent said friction plate member;
wherein when said solenoid assembly is not electrically actuated, said biasing members force said armature member and said friction plate member axially in a direction toward said housing member wherein said second friction lining member contacts said housing cover member causing said friction plate member and said central shaft member to rotate at input speed;
wherein said stop member restricts axial movement of said friction plate member when said solenoid assembly is activated.

* * * * *

UNITED STATES PATENT AND TRADEMARK OFFICE
CERTIFICATE OF CORRECTION

PATENT NO. : 9,279,460 B2  
APPLICATION NO. : 14/149683  
DATED : March 8, 2016  
INVENTOR(S) : Shiwei Qin It is certified that error appears in the above-identified patent and that said Letters Patent is hereby corrected as shown below:

Column 7,

| | |
|---|---|
| Claim 1, line 6 | after "housing", insert --member-- |
| Claim 1, line 20 | "actuated" should be --activated-- |
| Claim 1, line 22 | "member" should be --assembly-- |
| Claim 8, line 2 | before "shaft", insert --internal-- |

Column 8,

| | |
|---|---|
| Claim 11, line 12 | before "friction", insert --a-- |
| Claim 11, line 23 | "actuated" should be --activated-- |
| Claim 11, line 23 | "force" should be --forces-- |
| Claim 12, line 2 | before "shaft", insert --central-- |

Column 9,

| | |
|---|---|
| Claim 19, line 4 | before "rotatable", insert --a-- |
| Claim 19, line 4 | after "housing", insert --member-- |
| Claim 19, line 30 | "actuated" should be --activated-- |
| Claim 19, line 33 | before "cover", insert --housing-- |
| Claim 19, line 37 | before "cover", insert --housing-- |
| Claim 20, line 1 | "friction clutch assembly" should be --dual mode drive device-- |
| Claim 21, line 1 | "friction clutch assembly" should be --dual mode drive device-- |
| Claim 22, line 1 | "friction clutch assembly" should be --dual mode drive device-- |
| Claim 23, line 1 | "friction clutch assembly" should be --dual mode drive device-- |
| Claim 24, line 1 | "friction clutch assembly" should be --dual mode drive device-- |
| Claim 25, line 1 | "friction clutch assembly" should be --dual mode drive device-- |
| Claim 26, line 1 | "friction clutch assembly" should be --dual mode drive device-- |

Signed and Sealed this  
Sixteenth Day of August, 2016

Michelle K. Lee  
*Director of the United States Patent and Trademark Office*

CERTIFICATE OF CORRECTION (continued)
U.S. Pat. No. 9,279,460 B2

Column 9,

| | |
|---|---|
| Claim 27, line 1 | "friction clutch assembly" should be --dual mode drive device-- |
| Claim 28, line 1 | "friction clutch assembly" should be --dual mode drive device-- |

Column 10,

| | |
|---|---|
| Claim 29, line 1 | "friction clutch assembly" should be --dual mode drive device-- |
| Claim 30, line 1 | "friction clutch assembly" should be --dual mode drive device-- |
| Claim 31, line 1 | "friction clutch assembly" should be --dual mode drive device-- |
| Claim 32, line 1 | "friction clutch assembly" should be --dual mode drive device-- |
| Claim 33, line 1 | "friction clutch assembly" should be --dual mode drive device-- |
| Claim 34, line 12 | delete "said solenoid assembly with a solenoid coil member" |
| Claim 34, line 14 | replace "said" with --a-- before housing |
| Claim 34, line 18 | delete "a pulley member rotatable at input speed" |
| Claim 34, lines 19-20 | delete "a housing member attached to said pulley member and rotatable therewith" |
| Claim 34, line 24 | before "friction", insert --a-- |
| Claim 34, line 35 | "actuated" should be --activated-- |